(12) United States Patent
Zuber et al.

(10) Patent No.: US 7,208,225 B2
(45) Date of Patent: *Apr. 24, 2007

(54) PREFABRICATED PLASTER BOARD

(75) Inventors: Francois Zuber, Vedére (FR); Claude Leclercq, Pernes-Les-Fontaines (FR); Pascal Bourne-Chastel, Mormoiron (FR); Elizabeth A. Colbert, Blacklick, OH (US); Pierre Gagne, Varennes (CA); Roland Boucher, St-Hubert (CA); Sylvie Bilodeau, St-Armadn (CA)

(73) Assignee: Lafarge Platres, Avignon Cedex (FR)

( * ) Notice: Subject to any disclaimer, the term of this patent is extended or adjusted under 35 U.S.C. 154(b) by 415 days.

This patent is subject to a terminal disclaimer.

(21) Appl. No.: 10/308,084

(22) Filed: Dec. 3, 2002

(65) Prior Publication Data

US 2003/0084633 A1 May 8, 2003

Related U.S. Application Data

(63) Continuation-in-part of application No. 09/633,264, filed on Aug. 4, 2000, now abandoned, which is a continuation-in-part of application No. 09/316,013, filed on May 21, 1999, now Pat. No. 6,105,325, which is a continuation of application No. 08/793,444, filed on May 9, 1997, now abandoned.

(30) Foreign Application Priority Data

Jun. 30, 1995 (FR) .................................. 95 08153

(51) Int. Cl.
*B32B 13/08* (2006.01)
*E04F 13/00* (2006.01)

(52) U.S. Cl. ................ 428/328; 428/537.5; 428/537.7; 428/703; 428/332; 428/514; 52/417

(58) Field of Classification Search ................... 52/416, 52/415, 741.41, 461, 470, 417; 428/328, 428/332, 514, 537.5, 537.7, 703
See application file for complete search history.

(56) References Cited

U.S. PATENT DOCUMENTS

| | | |
|---|---|---|
| 1,439,289 A | 12/1922 | Buttress |
| 1,993,472 A | 3/1935 | Borsari-Fischer |
| 2,109,719 A | 3/1938 | Brusse |
| 2,205,423 A | 6/1940 | Lefebure |
| 2,754,795 A | 7/1956 | Enssle |
| 2,770,216 A | 11/1956 | Schock |
| 2,833,139 A | 5/1958 | Bosshard |
| 2,925,631 A | 2/1960 | Larson et al. |
| 3,003,979 A | 10/1961 | Ptasienski et al. |
| 3,180,058 A * | 4/1965 | Tillisch et al. ................ 52/417 |
| 3,256,223 A | 6/1966 | Heijmer |
| 3,284,980 A | 11/1966 | Dinkel |
| 3,382,119 A | 5/1968 | Henkel |
| 3,411,926 A | 11/1968 | Gogek et al. |
| 3,422,587 A | 1/1969 | Murray |
| 3,576,091 A | 4/1971 | Shull, Jr. |
| 3,708,935 A | 1/1973 | Kossuth et al. |
| 3,819,395 A | 6/1974 | Yocum |
| 3,835,074 A | 9/1974 | Desmarais |
| 3,907,725 A | 9/1975 | Forte et al. |

(Continued)

FOREIGN PATENT DOCUMENTS

AU  19322/92  1/1993

(Continued)

OTHER PUBLICATIONS

Chemical Abstracts, vol. 103, No. 8, Aug. 26, 1985, Abstract No. 58270z, p. 278; XP 000185205; Abstract of JP 60 065197.

(Continued)

*Primary Examiner*—Robert Canfield
(74) *Attorney, Agent, or Firm*—Buchanan Ingersoll & Rooney PC

(57) ABSTRACT

The present invention provides a construction assembly for interior works, comprising:

prefabricated elements, preferably flat prefabricated elements e.g. gypsum fiberboards, cement fiberboards, gypsum wall boards or plaster boards, wherein said prefabricated elements comprise a coating layer formed of at least one skim coat deposited on said prefabricated elements by a coating device; and at least one jointing material, e.g. a sealing coat, joint coat and/or joint pointing coat, which joints adjacent said prefabricated elements to form a substantially plane outer surface comprising the visible surface of said at least one jointing material and the visible surface of the skim coated prefabricated elements, wherein said at least one jointing material and said at least one skim coat comprise a mineral filler, a binder and water; and wherein the composition of said at least one jointing material and said at least one skim coat are adapted to each other, whereby said at least one jointing material and said skim coat form, both in a dry state, a substantially homogeneous outer surface having over substantially all its surface at least one of the parameters comprised in the group consisting of coloration, reflectance factor and surface water absorbability which is substantially homogeneous over said surface; and whereby said outer surface is ready to be decorated. For instance, said at least one of the parameters differs by no more than 10%, preferably no more than 5%, at different parts of the overall surface, so that at least 90%, preferably at least 95%, homogeneity is achieved.

45 Claims, No Drawings

U.S. PATENT DOCUMENTS

| | | | |
|---|---|---|---|
| 3,975,320 A | | 8/1976 | Lane et al. |
| 3,984,596 A | | 10/1976 | Failmezger |
| 4,117,183 A | | 9/1978 | Long |
| 4,204,030 A | * | 5/1980 | Takamizawa et al. ........ 428/447 |
| 4,205,041 A | | 5/1980 | Hymes |
| 4,242,406 A | * | 12/1980 | El Bouhnini et al. ........ 442/373 |
| 4,287,103 A | | 9/1981 | Francis et al. |
| 4,294,622 A | | 10/1981 | Brown |
| 4,448,639 A | * | 5/1984 | Long .......................... 162/124 |
| 4,454,267 A | | 6/1984 | Williams ...................... 524/43 |
| 4,558,079 A | | 12/1985 | Desmarais |
| 4,579,610 A | | 4/1986 | Kole et al. |
| 4,657,594 A | | 4/1987 | Struss |
| 4,661,164 A | | 4/1987 | Severinghaus, Jr. |
| 4,672,787 A | | 6/1987 | Murphy |
| 4,686,253 A | | 8/1987 | Struss et al. |
| 4,725,477 A | * | 2/1988 | Kole et al. ................ 428/195.1 |
| 4,743,475 A | * | 5/1988 | Negri et al. ................. 427/387 |
| 4,820,754 A | * | 4/1989 | Negri et al. ................... 524/44 |
| 4,845,152 A | | 7/1989 | Palmer |
| 4,959,272 A | * | 9/1990 | Long ........................ 428/537.7 |
| 4,965,031 A | | 10/1990 | Conroy |
| 4,988,543 A | | 1/1991 | Houle et al. |
| 5,019,195 A | | 5/1991 | Skinner |
| 5,055,323 A | | 10/1991 | Kole et al. |
| 5,088,260 A | | 2/1992 | Barton et al. |
| 5,102,462 A | | 4/1992 | Podlas |
| 5,143,757 A | | 9/1992 | Skinner |
| 5,207,830 A | | 5/1993 | Cowan et al. |
| 5,230,200 A | | 7/1993 | Douglas et al. |
| 5,258,069 A | | 11/1993 | Knechtel et al. |
| 5,334,243 A | | 8/1994 | Hyman |
| 5,336,318 A | | 8/1994 | Attard et al. |
| 5,395,685 A | * | 3/1995 | Seth et al. ..................... 442/67 |
| 5,397,631 A | * | 3/1995 | Green et al. ................. 428/219 |
| 5,487,250 A | | 1/1996 | Yount et al. |
| 5,637,362 A | * | 6/1997 | Chase et al. ................... 428/15 |
| 5,702,828 A | * | 12/1997 | Adler et al. ................. 428/540 |
| 5,714,032 A | | 2/1998 | Ainsley et al. |
| 5,746,822 A | | 5/1998 | Espinoza et al. |
| 5,908,521 A | | 6/1999 | Ainsley et al. |
| 5,908,821 A | | 6/1999 | Labeque et al. |
| 5,922,447 A | | 7/1999 | Baig |
| 5,945,198 A | * | 8/1999 | Deodhar et al. ............. 428/143 |
| 5,987,835 A | | 11/1999 | Santarossa |
| 6,077,966 A | | 6/2000 | Matsumura et al. |
| 6,105,325 A | * | 8/2000 | Zuber et al. .................. 52/416 |
| 6,106,607 A | | 8/2000 | Be et al. |
| 6,165,261 A | | 12/2000 | Wantling |
| 6,171,388 B1 | | 1/2001 | Jobbins |
| 6,177,180 B1 | | 1/2001 | Bodine et al. |
| 6,221,521 B1 | | 4/2001 | Lynn et al. |
| 6,238,476 B1 | | 5/2001 | Sprinkle |
| 6,268,042 B1 | | 7/2001 | Baig |
| 6,586,520 B1 | * | 7/2003 | Canorro et al. .............. 524/514 |
| 6,663,979 B2 | * | 12/2003 | Deodhar et al. .......... 428/537.7 |
| 6,733,581 B2 | * | 5/2004 | Langford .................... 106/661 |
| 6,808,793 B2 | * | 10/2004 | Randall et al. ............. 428/219 |
| 2002/0086114 A1 | | 7/2002 | Madsen |
| 2002/0187298 A1 | * | 12/2002 | Hauber et al. ................ 428/70 |
| 2003/0084633 A1 | | 5/2003 | Zuber et al. |
| 2003/0085306 A1 | | 5/2003 | John et al. |
| 2003/0113572 A1 | | 6/2003 | Deodhar et al. |
| 2003/0153651 A1 | * | 8/2003 | Bonetto et al. ................ 524/2 |
| 2003/0175478 A1 | * | 9/2003 | Leclerq ...................... 428/105 |
| 2004/0154264 A1 | | 8/2004 | Colbert |
| 2004/0216424 A1 | * | 11/2004 | Zuber et al. ............... 52/782.1 |
| 2004/0266304 A1 | * | 12/2004 | Jaffee ......................... 442/386 |
| 2005/0076610 A1 | * | 4/2005 | Mourier ..................... 52/782.1 |
| 2005/0121131 A1 | * | 6/2005 | Hennis et al. ................ 156/41 |
| 2005/0210829 A1 | * | 9/2005 | Brunk et al. ................ 52/796.1 |

FOREIGN PATENT DOCUMENTS

| | | |
|---|---|---|
| EP | 0 496 682 | 7/1992 |
| EP | 0496682 A1 | 7/1992 |
| EP | 0521804 | 7/1993 |
| GB | 1513763 | 6/1978 |
| JP | 09/109131 | 4/1997 |
| JP | 02/06183 A1 | 1/2002 |
| RU | 2 147 594 C1 * | 4/2000 |
| WO | 97/02395 A1 | 1/1997 |
| WO | 02/21244 A2 | 2/2002 |
| WO | 02/058902 A2 | 8/2002 |
| WO | 05/040475 | 5/2005 |

OTHER PUBLICATIONS

Database WPI, Week 199727, AN 1997-293470, XP002198594, Abstract of JP 09 109131.

Derwent WPI AN 1997-109001, Week 199710, Abstract of WO 9702395.

Derwent WPI AN 1989-016493, Week 198903, English Abstract of DE 3721668.

Derwent WPI AN 1993-002309, Week 199301, English Abstract of EP 0521804.

J.R. Gorman, et al., "Plaster and Drywall Systems Manual," BNI Books, Division of Buidling News, Inc., Apr. 12, 2003, pp. 240 and 251.

The White Book 1986 Edition, British Gypsum, Apr. 12, 2003.

The White Book, Plasterboard Fixing, Jointing and Decorating, British Gypsum, Apr. 12, 2003.

G.D. Plumb, M.A., Lightweight Partitions Having Improved Low Frequency Sound Insulations, Research and Development Department, 10 pages, Jun. 1995.

9 White, Medium Calcium Carbonate Filter, Georgia Marble Company, May 1996.

Water Absorbency of Bibulous Papers, T 432 cm—99, Approved by the Physical Properties Committee of the Process and Product Quality Division, 1999.

Water Absorbency of Bibulous Papers, T 432 om—94, Approved by the Chemical Properties Committee of the Process and Product Quality Division, 1994.

Standard Conditioning and Testing Atmospheres for Paper, Board, Pulp Handsheets and Related Products, T 402 om—93, Approved by the Physical Properties Committee of the Process and Product Quality Division, 1993.

Gypsum Plasterboards, Mar. 1995, 30 pages.

Ken A. Phillips, et al., Industrial Minerals in Arizona's Wallboard Joint Cement Industry, Jul. 1989, 6 pages.

Ken Phillips, et al., Industrial Minerals in Southern California's Wallboard Joint Cement Industry, Sep. 1989, 6 pages.

Gypsum Plasterboard—Part 1: Specification for Plasterboard Excluding Material Submitted to Secondary Operations, 1985, 10 pages.

Dry Lining and Partitioning Using Gypsum Plasterboard, British Standard, 1995, 50 pages.

Sauli Rennes, et al., The Influence of Binders on the Structure and Water Sorption of Coated Paper, pp. 698-703, Jun. 1989.

Technical Data, Calmote, Ad, Omya UK, Jan. 1997.

Attagel 50, Engelhard, Jan. 3, 2003.

Engelhard Material Safety Data Sheet, Lawrence Industries, Aug. 19, 1992.

Fordamin Stinnes Logistics, Fordacal S2 Talc, Mar. 2001.

Defoamers for Eumulsion Paints and Emulsion Plasters, BYK Chemie, 4 pages.

4 Walocel M Delivery Programme.

Emultex 596, Synthomer International Technology Individual Service, Jul. 2002.

Sil-Cel 35/34, Silbrico Corporation, 2 pages, 1993.

Methocel Cellulose Ethers for Gypsum-Based Building Materials, How Methocel Cellulose Ethers Products Maximise the Performance of Gypsum-based Building Materials, Aug. 1999.

Elotex LIQ2020, Technical Data Sheet, Mar. 14, 2002.

Twinstar Chemicals Limited, Benzoflex 9-88 Plasticiser Dipropyleneglycol Dibenzoate, 5 pages, Jun. 1996.

"ACUMER® 9400—Dispersant for Paper and Paperboard Coatings", Rohm and Haas Company, Special Polymers, 1 page Oct. 1994.

"ACUMER® 9300—Dispersant for Paper and Paperboard Coatings", Rohm and Haas Company, Special Polymers, 1 page Oct. 1994.

George M. Kutcher, Jr., CDT, CSI, "Revisiting the Levels of Gypsum Board Finish", National Gypsum Company, pp. 1-3 Mar. 2004.

* cited by examiner

PREFABRICATED PLASTER BOARD

CROSS-REFERENCE TO RELATED APPLICATIONS

This application is a continuation of U.S. patent application Ser. No. 09/633,264, filed Aug. 4, 2000 now abandoned, which is a continuation-in-part application of U.S. patent application Ser. No. 09/316,013, filed May 21, 1999, now U.S. Pat. No. 6,105,325, which is a continuation of U.S. patent application No. 08/793,444, filed May 9, 1997, now abandoned, the disclosures of which are incorporated by reference herein in their entirety.

BACKGROUND OF THE INVENTION

1. Field of the Invention

The present invention relates to the construction of interior works. More particularly, the invention is concerned with any construction method, involving prefabricated elements, especially flat prefabricated elements such as boards, and at least one jointing material, e.g. a sealing coat, joint coat and/or a joint-pointing coat, which can be used especially for the finishing of a joint. The prefabricated elements can be gypsum fiberboards, cement fiberboards, gypsum wallboards or plaster boards comprising a plaster board and at least one sheet of lining paper, at least one outer layer of which has a visible outer face ready to be decorated. Said prefabricated elements are assembled together, optionally with a jointing material, and the joints are finished with a sealing coat, joint coat and/or joint-pointing coat, so as to obtain an overall visible outer surface which is relatively uniform or plane, including in the region of the joints. Such a method is employed, for example, when plasterboards covered with a cardboard lining having a joint-pointing coat are assembled, for the purpose of defining spaces within a building, especially partitions.

2. Description of Related Art

According to the document EP-A-0,521,804, the lining paper may comprise an upper layer, called an upper web, comprising white cellulose fibres, mainly synthetic, and a mineral filler of light colour, preferably white, and a pigment layer covering the upper layer, comprising a mineral filler of light colour, preferably white, and a binder.

In general the overall visible outer surface obtained according to the above-defined method needs to be prepared, before receiving any surface decoration, such as one or more layers of a film covering of the paint or lacquer type or a wallpaper. This preparation is necessitated especially by the shade or colour differences existing between the visible outer surface of the flat prefabricated elements, for example plasterboards, and the visible outer surface of the joints. After the interior work has been completed, this preparation involves covering the overall surface obtained, i.e., the lining of the flat prefabricated elements plus the joints, with one or more layers of a paint or priming or finishing coat.

The preparation operation represents an appreciable additional cost, for example in a complete process for the construction of a building. And in some cases, it is still insufficient for obtaining an overall decorated surface of uniform appearance, particularly in view of the physico-mechanical differences prevailing between the joints and the flat prefabricated elements.

SUMMARY OF THE INVENTION

The object of the present invention is to overcome the abovementioned disadvantages. More specifically, the object of the invention is a construction method breaking with the traditional approach adopted for solving the problem explained above, that is to say avoiding the need for a preparation of the overall surface, before any decoration. However, the object of the invention is a method which remains compatible with the practices of the professionals in the construction industry, especially those involved in interior works.

According to the present invention, the method differs from the traditional approach in that (1) the structure and/or composition of the external surfaces of prefabricated elements, preferably flat prefabricated elements such as boards, e.g. gypsum fiberboards, cement fiberboards, cement wallboards or plasterboards comprising a sheet of lining paper and a plaster body, and (2) the composition of a jointing material, e.g. a sealing coat, a joint coat and/or a joint-pointing coat, are coordinated with one another in order, in the dry state of the jointing material, e.g. the sealing coat, joint coat and/or joint-pointing coat, to obtain an overall surface having one or more physical characteristics, including colour or shade, which are substantially homogeneous in virtually the entire overall surface, including in the region of the visible outer face of the joints. For instance, the one or more physical characteristics differ by no more than 10%, preferably no more than 5%, at different parts of the overall surface, so that at least 90%, preferably at least 95%, homogeneity is achieved. In other words, as an example, when the jointing material is dry, the one or more physical characteristics of the outer surface of the jointing material can differ by not more than 10%, preferably not more than 5%, from the corresponding physical characteristics of the outer surface of the prefabricated elements.

According to other objects of the invention, a construction assembly for interior works is provided, comprising (1) at least one prefabricated element, preferably a flat prefabricated element, especially a board such as a gypsum fiberboard, cement fiberboard, cement wallboard or plaster board comprising a plaster body and a lining paper, wherein at least one outer layer of which has a visible outer face ready to be decorated, and (2) a jointing material, e.g. a sealing coat, joint coat and/or joint-pointing coat capable of being used especially for the finishing of a joint.

In this assembly, the structure and/or composition of the external surface of the prefabricated element, e.g. the sheet of lining paper of the plaster board, and the composition of the jointing material, e.g. a sealing coat, joint coat and/or joint-pointing coat, are coordinated with one another in order, in the dry state of the joint material, to obtain an overall surface having one or more physical characteristics, including colour or shade, which are substantially homogeneous in virtually the entire overall surface, including in the region of the visible outer face of the joints (for instance, the one or more physical characteristics differ by no more than 10%, preferably no more than 5%, at different parts of the overall surface, so that at least 90%, preferably at least 95%, homogeneity is achieved on the overall surface based on the one or more physical characteristics).

In the present invention, the final joint between adjacent prefabricated elements can be made of a sealing coat or joint coat as a primary joint, with the application of a joint-pointing coat as a secondary or finishing joint. Alternatively, in the present invention, the final joint between adjacent prefabricated elements can be made of the sealing coat or joint coat finished with one or more further layers of the same sealing or joint coat.

A joint-pointing coat, intended to be used in the method or the assembly according to the invention, is also provided.

The present invention affords the following decisive advantages which result from the surface homogeneity of the overall surface obtained according to the present invention, not only in terms of color or shade, but also in terms of particular physical or physico-chemical characteristics.

Thus, by homogenizing the surface absorption capacity of the lining paper and of the jointing material, e.g. the sealing coat, joint coat and/or joint-pointing coat, a virtually perfect appearance of the paint layer or paint layers and a virtually uniform adhesion of a wallpaper can be obtained. This subsequently is conducive to the homogeneous detachment of the wallpaper.

DESCRIPTION OF THE PREFERRED EMBODIMENTS

In a preferred version of the invention, there is a sealing coat intended for forming essentially the joints between various flat prefabricated elements, with the joint-pointing coat being a finishing coat which can be applied to the sealing coat.

According to the advantageous embodiment of the invention, when there are preexisting flat prefabricated elements, the composition of the jointing material, e.g. the sealing coat, joint coat and/or the joint-pointing coat, is coordinated with the structure and/or composition of the outer surface of the flat prefabricated elements, e.g. the sheet of lining paper.

According to another version of the invention, and converse to the foregoing, for a preexisting joint-pointing coat, the composition of the outer surface of the flat prefabricated elements, e.g. the sheet of lining paper, is coordinated with the composition of the jointing material, e.g. the sealing coat, joint coat and/or the joint-pointing coat.

Moreover, the method is more preferably characterized in that, in addition to the colour or shade, at least any one of the following physical characteristics is homogenized or matched between flat prefabricated elements and the jointing material, namely:
the surface appearance, including reflectance;
the absorption of surface water;
decoloration or coloration under the effect of natural light.

Advantageously, these various physical characteristics are defined as follows:
the reflectance factor of the overall surface, including that of
  the visible outer face of the joints, is between 70% and 80%, and preferably between 72% and 76%, for a wavelength of 457 nm;
  the decoloration or coloration of the overall surface, including that of the visible outer face of the joints, has a colour deviation (delta E*) at most equal to 3 after exposure for 72 hours to a source of UV radiation arranged at 15 cm from the surface and having a wavelength at least equal to 290 nm;
the surface water absorption of the overall surface, including that of the visible outer face of the joints, is not less than 60 minutes and/or is at most equal to 15 g/m² according to the COBB test, at 23° C.

In practice, and by means of routine tests, the average person skilled in the art knows how to coordinate the structure and/or composition of the outer surface, e.g. the sheet of lining paper, of the prefabricated elements such as boards, and/or the composition of the externally visible jointing material, e.g. the joint-pointing coat, so as to satisfy the above-defined technical principles. As a result, the examples described below are in no way limiting.

The present invention will now be described by taking flat prefabricated elements, plasterboards, as an example. These boards are typically composed of a factory-cast plaster body between two sheets of paper forming both its lining and its reinforcement.

Conventionally, one of the sheets of paper used for making the plasterboards has a dark colour which can vary between a grey colour and a chestnut colour, since it is composed of cellulose fibres which have not undergone any particular purifying treatment. Traditionally, this so-called grey paper is obtained from unbleached chemical pulp and/or from mechanical pulp, and/or from thermomechanical pulp and/or from semi-chemical pulp. By mechanical pulp, it is usually meant a pulp obtained entirely by mechanical means from various raw materials, essentially wood, which can be provided by salvaged products originating from wood, such as old cardboard boxes, trimmings of kraft paper and/or old newspapers. Thermomechanical pulp means a pulp obtained by thermal treatment followed by a mechanical treatment of the raw material. By semi-chemical pulp is meant a pulp obtained by eliminating some of the non-cellulose components from the raw material by means of chemical treatment and requiring a subsequent mechanical treatment in order to disperse the fibres.

The other sheet of plasterboards has a visible face, called a lining face, of a colour generally lighter than the grey sheet. To obtain this lighter colour, the layer or layers of this face are based on chemical pulp, if appropriately bleached, composed of recycled and/or new cellulose fibres, and/or on mechanical pulp, if appropriately bleached. By chemical pulp is meant a pulp obtained by eliminating a very large proportion of the non-cellulose components from the raw material by chemical treatment, for example, by cooking in the presence of suitable chemical agents, such as soda or bisulphites. When this chemical treatment is completed by bleaching, a large part of the coloured substances is eliminated, as well as the substances which risk decomposing by ageing and giving unpleasant yellow shades associated with the presence of, for example, lignin.

In a preferred embodiment of the method of the invention, according to the document EP-A-0 521 804, the content of which is incorporated by reference, the lining paper comprises an upper layer, called an upper web, comprising white cellulose fibres, mainly synthetic, a mineral filler of light colour, preferably white, and a pigment layer covering the upper layer. The pigment layer comprises a mineral filler of light colour, preferably white, and a binder. Correspondingly, according to the present invention, the joint-pointing coat comprises a mineral filler of light colour, preferably white, the grain size of which is between 5 and 35 µm.

The fineness of the grain size of the mineral filler of the joint-pointing coat makes it possible to obtain a smooth surface corresponding to that of the lining of the board. Too large a grain size of the filler gives rise to overall surface defects, such as a reflection of light radiation on the surface of the coat which is different from that on the surface of the board, bringing about differences in tone and brightness of the shade. Too large a grain size also gives rise to differences in physical appearance which are associated with the differences in roughness between the board and the coat.

The mineral filler represents preferably between 50% and 85% of the total weight of the joint-pointing coat.

Moreover, the coat can comprise a hydrophobic agent, for example between 0.2% and 5%, and preferably between 0.5% and 3%, of the total weight of the coat, for example a silicone derivative. This agent slows the drying kinetics of the coat, which is conducive to the non-cracking of the coat. Also, this agent has higher resistance to the attack of steam during operations for the removal of wallpaper, so that the removal can be achieved without thereby impairing the good bonding of a paint or paper adhesive on the overall surface, including the visible surface of the joints. In fact, this hydrophobic agent makes it possible to level off the absorbent capacities of the surfaces of the coat and of the lining paper of the board. Thus, all paints or paper adhesives applied to the overall surface obtained exhibit little shift in absorption kinetics between the coat and the board, thus making it possible to avoid the appearance of spectra or of defects in shade homogeneity.

The coat also comprises an organic binder dispersible in aqueous phase, in a proportion of between 1 and 20%, and preferably between 2 and 12%, of the total weight of the joint-pointing coat, for example polyvinyl acetates and/or acrylic acid esters. The choice of this binder is important, since it must impart sufficient flexibility to the coat to withstand mechanical stresses, and it must have both an adhesive capacity for obtaining a good bond on the overall surface and good resistance to the attacks of UV light.

Moreover, a handling agent is provided in the composition of the coat, especially a water-retaining and thickening agent, for example methylhydroxyethylcellulose, in a proportion of 1 to 15%, and preferably of 2 to 12%, of the total weight of the joint-pointing coat.

Finally, at least one slipping agent can be included in the composition of the coat, especially a clay, in the proportion of 0.1 to 2%, and preferably of 0.1 to 0.6%, of the total weight of the joint-pointing coat. These clays are preferably silicate derivatives and more preferably clays of the attapulgite type.

Other components, such as biocides, dispersants, anti-foaming agents and pigments can also be incorporated in the composition of the coat in the conventional way.

The invention will be understood better from the following detailed example given as a non-limiting indication.

We proceed from plasterboards similar to Example 5 of document EP-A-0 521 804, which are assembled by means of a conventional sealing joint, for example a joint coat sold under the registered trade mark of "PREGYLYS"® of the Company PLATRES LAFARGE. The upper web of the lining of the board is obtained from 65% bleached synthetic cellulose fibres and 35% talcum and is covered with a pigment layer comprising, as mineral filler, 85% by weight of $CaSO_4, 2H_2O$ in the form of needles of a length of between 3 and 5 μm and, as a binder, 10.3% by weight of styrene-butadiene copolymer. The sealing joint subsequently receives a thin layer of a joint-pointing coat according to the invention, having the following composition:

50 to 85% by weight of calcium carbonate, grain size from 5 to 35 μm, as a mineral filler;
2 to 12% by weight of a binder comprising polyvinyl acetates and acrylic acid esters in aqueous dispersion;
0.5 to 3% by weight of a silicone derivative as a hydrophobic agent;
0.1 to 0.9% of a cellulose derivative of the methylhydroxyethylcellulose type;
0.1 to 0.6% of a slipping agent of the attapulgite type;
1 to 12% of another silicate derivative as an additional slipping agent;
0.1 to 5% of a polycarboxylic acid ammonium salt as a dispersant;
0.001 to 0.015 of an iron oxide as a pigment;
0.1 to 0.3% of a preparation of N-fonroles and isothiazolinones as a biocide;
0.1 to 0.3% of a conventional anti-foaming agent;
water up to 100%.

The weight percentages given are in relation to the total weight of the coat, unless indicated otherwise.

For comparison requirements, standard boards conforming solely to French standard NF P 72-302 and not comprising the above-defined upper web and pigment layer are assembled by means of a joint coat for a plasterboard of the range of coats "PREGYLYS"®, sold by the Company PLATRES LAFARGE.

The characteristics of the two overall surfaces thus formed are compared by applying the following tests:

(A) Degree of whiteness or reflectance factor R obtained according to standard NFQ 03038 with a wavelength of 457 nm. This degree represents the percentage ratio between of a reflected radiation of the body in question and that of a perfect diffuser under the same conditions.

(B) Surface water absorption obtained, for example, according to the COBB test. In this test, a ring defining an area of 100 cm² is filled with distilled water at 23° C. to a height of approximately 10 nm. The water is left in contact with the overall surface forming the bottom of the ring for one minute, and then the water is emptied and the excess spin-dried. The weight gain of the surface is subsequently determined and brought back to an area of 1 m². In an alternative version, a drop of distilled water of a volume of approximately 0.05 cm³ at 23° C. is deposited on the surface. It is important that the drop be deposited and not allowed to fall from a variable height which consequently would crush it to a greater or lesser extent, thus falsifying the result. The duration in minutes represents the surface absorption of the tested area.

(C) UV radiation resistance obtained by exposing the overall surfaces, in a cabinet comprising eight high pressure mercury vapour lamps, each of 400 watts, to a wavelength which is not less than 290 nm. The surfaces are maintained at a distance of 15 cm from the lamps and at a temperature of 60° C. for 72 hours. The colour deviations delta E* are measured on a spectrocolorimeter according to the standard DIN 6174 at an angle of 8°, illuminant D65 as a bright specular, included in the system L*, a*, b*, in which L* is the luminance, a* represents the transition from green to red, and b* represents the transition from blue to yellow. A point E* in this system, the said point being a function of L*, a*, b*, defines the colorimetry of a sample and the deviation is measured in relation to a reference point. In general terms, a colour deviation beyond 2 becomes discernible to the naked eye.

The results of the tests (A) and (B) are collated in Table I and those of the test (C) are collated in Table II below.

TABLE I

|  | Standard overall surface | Overall surface according to the invention |
|---|---|---|
| Reflectance R (%) | Board: 50 to 60 | Board: 72 to 76 |
|  | Coat: 65 to 85 | Coat: 72 to 76 |
| Absorption | 19 | 13 |
| COBB (g/m²) | Board: 50 | Board: >=60 |
| Alternative (min) | Coat: 15 | Coat: >=60 |

This shows that the overall surface according to the present invention is clearly more homogeneous than that of an assembly according to the conventional technique. Moreover, the more homogeneous absorption time of the overall surface makes it possible to use a paint having less covering capacity than that necessary with traditional boards and coats and is also beneficial to the painting operation.

TABLE II

| Before Exposure | Standard | Invention |
|---|---|---|
| Initial measurements of the board | L* = 82.94<br>a* = −0.43<br>b* = 4.64 | L* = 90.41<br>a* = −0.03<br>b* = 3.13 |
| Initial measurements of the joint | L* = 90.70<br>a* = 0.73<br>b* = 5.28 | L* = 89.70<br>a* = 0.50<br>b* = 3.60 |
| | Board/Joint colour deviation delta E* = 7.87 | Board/Joint colour deviation delta E* = 1 |
| Exposure to UV for 72 hours | | |
| Measurements of the board after exposure | L* = 81.10<br>a* = 0.69<br>b* = 12.93 | L* = 90.38<br>a* = −0.91<br>b* = 7.40 |
| | Colour deviation delta E* = 8.56; very substantial yellowing plus chestnut spots | Colour deviation delta E* = 4.36; substantial yellowing |
| Measurements of the joint after exposure | L* = 88.90<br>a* = 0.91<br>b* = 3.83 | L* = 89.17<br>a* = 0.50<br>b* = 3.19 |
| | Colour deviation delta E* = 2.32; slight yellowing plus a few chestnut spots | Colour deviation delta E* = 0.67; very slight colour deviation |

This table shows that the colour deviation before exposure to UV is much slighter for an overall surface according to the invention than for an overall surface such as is obtained traditionally.

This table also shows that the change in the colour deviation after exposure to UV is much less pronounced in the overall surface according to the invention than traditionally. In fact, the colour deviation before exposure and after exposure must be as little as possible, so that the overall surface does not give the impression to the naked eye of being spotted or being covered with zones of different shade and brightness.

This is not possible with an overall surface obtained by means of traditional plasterboards and products, but the very slight deviation of the overall surface according to the invention makes it possible to mitigate this disadvantage.

The present invention also provides in an alternate embodiment another way to provide a good matching at the joints between the prefabricated elements, preferably flat prefabricated elements such as gypsum fiberboards, cement fiberboards, gypsum wallboards or plaster boards.

According to this embodiment, a coat having a composition similar and/or adapted to the composition of the jointing material, e.g. the sealing coat, joint coat and/or the joint-pointing coat, is applied as a so-called "skim coat" (i.e., a film coat of relatively low thickness) on the outer surface of the prefabricated elements, e.g. the liner of standard plaster boards. This skim coat is applied, for example in the plant by, for instance, roll coating or spraying via a coating device, on the prefabricated element so that the skim-coated prefabricated element is delivered to the assembly site already with a skim coat on it. Said skim coat, since it has a composition matching the composition of the jointing material, e.g. the sealing coat, joint coat and/or the joint-pointing coat, for a joint will provide, once applied, uniform characteristics to the final surface.

The invention thus provides a construction assembly for interior works, comprising:
 prefabricated elements, preferably flat prefabricated elements e.g. gypsum fiberboards, cement fiberboards, gypsum wall boards or plaster boards, wherein said prefabricated elements comprise a coating layer formed of at least one skim coat deposited on said prefabricated elements by a coating device; and
 at least one jointing material, e.g. a sealing coat, joint coat and/or joint pointing coat, which joints adjacent said prefabricated elements to form a substantially plane outer surface comprising the visible surface of said at least one jointing material and the visible surface of the skim coated prefabricated elements, wherein said at least one jointing material and said at least one skim coat comprise a mineral filler, a binder and water; and wherein the composition of said at least one jointing material and said at least one skim coat are adapted to each other, whereby said at least one jointing material and said skim coat form, both in a dry state, a substantially homogeneous outer surface having over substantially all its surface at least one of the parameters comprised in the group consisting of coloration, reflectance factor and surface water absorbability which is substantially homogeneous over said surface; and whereby said outer surface is ready to be decorated. For instance, said at least one of the parameters differs by no more than 10%, preferably no more than 5%, at different parts of the overall surface, so that at least 90%, preferably at least 95%, homogeneity is achieved. In other words, as an example, when said at least one jointing material and the prefabricated elements are dry, said at least one of the parameters of the visible surface of said at least one jointing material can differ by not more than 10%, preferably not more than 5%, from the corresponding parameter of the visible surface of the prefabricated elements.

In the present invention, the prefabricated elements, preferably flat, can be gypsum fiberboards, cement fiberboards, gypsum wallboards or plaster boards. In this embodiment, the prefabricated elements preferably are plaster boards, each of which plaster boards comprises a plaster body and at least one sheet of lining paper, wherein the lining paper comprises an upper layer or web comprising cellulose fibers of a color, preferably white, and/or a mineral filler of a color, preferably a light color.

According to a preferred embodiment, said at least one jointing material and said at least one skim coat exhibit substantially the same surface water absorbability. Preferably, said at least one jointing material and said at least one skim coat exhibit also substantially the same coloration and/or reflectance factor.

According to a preferred embodiment, said at least one jointing material, e.g. the joint-pointing coat, and said at least one skim coat have substantially the same solids formulation, the skim coat when applied having a solids content lower than the jointing material when applied.

Especially, when the skim coat is applied, the viscosity will be adjusted to the viscosity needed for the coating apparatus that will be used.

The coating apparatus is generally a coating roll, which is operated under standard conditions for coating a product onto a board. The dimensions, rotation speed, feeding, temperature, and any other operating conditions are within the skill of a person of ordinary skill in the art.

For example, compared to the jointing material such as the joint-pointing coat, the skim coat, when applied (for example, when the skim coat is applied to the prefabricated elements, or when the skim coated prefabricated elements are assembled in the methods of the present invention), will comprise more water than initially present in the jointing material such as the joint-pointing coat. It will thus generally comprise additional water, e.g., about 10 to 60%, preferably about 15 to 40%, more preferably about 25%, more water than initially present in the jointing material such as the joint-pointing coat. By "water initially present in the jointing material", it means the amount of water present in the jointing material when the jointing material is applied to the skim coated prefabricated elements, before the jointing material is in a dry state.

The final thickness of the skim coat (determined when dry) is generally between about 0.001 and about 3 mm, preferably between about 0.01 and about 2 mm, more preferably between about 0.01 and about 1 mm, and most preferably between about 0.2 and about 1 mm.

According to another preferred embodiment, the jointing material such as the sealing coat, joint coat and/or joint-pointing coat and the skim coat have the following composition, by weight:
- 40 to 70% of a mineral filler, such as calcium carbonate;
- 1 to 10% of hydrophobic surface perlite;
- 0.1 to 10% of a binder such as polyvinyl acetates and acrylic acid esters in aqueous solution;
- 0.1 to 10% of a handling agent such as a cellulosic ether;
- 0.1 to 5% of a slipping agent such as clay;
- 0.1 to 20% of another silicate derivative as an additional slipping agent, such as talc and mica;
- water with optional conventional additives up to 100%.

The compositions of the jointing material such as the joint-pointing coat and the skim coat are not limited to the components disclosed above in the above amounts for the preferred embodiment. These components may be present in other amounts in the compositions of the jointing material such as the joint-pointing coat and the skim coat.

By using the embodiment involving the skim coat, it is possible to obtain the same surface water absorption, reflectance factor and/or colour deviation as with the first embodiment depicted above, i.e. the embodiment involving adapting the composition of the jointing material, e.g. the sealing coat, joint coat and/or joint-pointing coat, to the composition of the surface of the prefabricated elements, e.g. the upper layer or web and/or the pigment layer of the plaster boards, to form a substantially homogeneous outer surface in the dry state.

The invention also provides a method for the construction on interior works, comprising the following steps:
assembling, with at least one jointing material, e.g. a sealing coat, joint coat and/or joint-pointing coat, prefabricated elements (preferably flat prefabricated elements such as gypsum fiberboards, cement fiberboards, gypsum wallboards or plaster boards, each of which plaster boards comprises a plaster body and at least one sheet of lining paper, wherein the lining paper comprises an upper layer or web comprising cellulose fibers of a color, preferably white, and/or a mineral filler of a color, preferably a light color), wherein said prefabricated elements have a coating layer formed of at least one skim coat deposited on an outer surface of said prefabricated elements by a coating device;
jointing between adjacent said prefabricated elements with a sealing coat or joint coat to form at least one joint;
finishing said at least one joint with at least one jointing material, wherein said at least one jointing material can be a sealing coat, joint coat and/or joint pointing coat; and thereafter
drying said at least one jointing material;

wherein said at least one jointing material and said at least one skim coat comprise a mineral filler, a binder and water; and wherein the compositions of said at least one jointing material and said at least one skim coat are adapted to each other, whereby said at least one jointing material and said at least one skim coat form, both in a dry state, a substantially homogeneous outer surface having over substantially all its surface at least one parameter (which parameter can be a parameter selected from the group consisting of coloration, reflectance factor and surface water absorbability) which is substantially homogeneous over said surface; and whereby said outer surface is ready to be decorated. For instance, said at least one parameter differs by no more than 10%, preferably no more than 5%, at different parts of the overall surface, so that at least 90%, preferably at least 95%, homogeneity is achieved. In other words, as an example, when the at least one jointing material and the prefabricated elements are dry, said at least one parameter of the visible surface of the at least one jointing material can differ by not more than 10%, preferably not more than 5%, from the corresponding parameter of the visible surface of the prefabricated elements.

The invention also provides a kit for the construction of interior works, comprising:
at least one prefabricated element, preferably a flat prefabricated element such as a board, e.g. a gypsum fiberboard, cement fiberboard, gypsum wallboard or plaster board (said plaster board comprising a plaster body and at least one sheet of lining paper, wherein the lining paper comprises an upper layer or web comprising cellulose fibers of a color, preferably white, and/or a mineral filler of a color, preferably a light color), wherein said prefabricated element comprises a coating layer formed of at least one skim coat deposited on an outer surface of said prefabricated element by a coating device;
at least one jointing material, e.g. a sealing coat, joint coat and/or joint-pointing coat, for jointing said prefabricated elements to form a substantially plane outer surface comprising the visible surface of at least one joint and the visible surface of the skim-coated prefabricated element, wherein said at least one jointing material and said at least one skim coat comprise a mineral filler, a binder and water; and wherein the compositions of said at least one jointing material and said at least one skim coat are adapted to each other, whereby said at least one jointing material and said at least one skim coat form, both in a dry state, a substantially homogeneous outer surface having over substantially all its surface at least one parameter (which one parameter can be a parameter selected from the group consisting of coloration, reflectance factor and surface water absorbability) which is substantially homogeneous over said surface; and whereby said outer surface is ready to be decorated. For instance, said at least one parameter differs by no more than 10%, preferably no more than 5%, at different parts of the overall surface, so that at least 90%, preferably at least 95%, homogeneity is achieved. In other words, as an example, when the at least one jointing material and the prefabricated elements are dry, said at least one parameter of the visible surface of the at least one jointing material can differ by not more than 10%, preferably not more than 5%, from the corresponding parameter of the visible surface of the prefabricated elements.

Finally, the invention provides a plaster board useful for carrying out the method of the invention, as well as other methods for the construction on interior works, where said plaster board is a flat prefabricated plaster board, comprising a plaster body and at least one sheet of lining paper, wherein the lining paper comprises an upper layer or web comprising cellulose fibers of a color, preferably white, and/or a mineral filler of a color, preferably a light color, and a coating layer formed of at least one skim coat deposited on said lining paper by a coating roll, the at least one skim coat having a thickness generally between about 0.001 and about 3 mm, preferably about 0.01 and about 2 mm, more preferably between about 0.1 and about 2 mm, and most preferably between about 0.2 and about 1 mm.

The invention claimed is:

1. A flat prefabricated plaster board, comprising a plaster body and at least one sheet of lining paper, wherein the lining paper comprises an upper layer or web comprising cellulose fibers or cellulose fibers and a mineral filler, and a coating layer comprising a jointing material type skim coat deposited on said lining paper by a coating roll, said skim coat having a thickness between about 0.2 mm and about 2 mm.

2. The plaster board according to claim 1, wherein said skim coat comprises, by weight:
   40 to 70% of a mineral filler;
   1 to 10% of hydrophobic surface perlite;
   0.1 to 10% of a binder;
   0.1 to 10% of a handling agent;
   0.1 to 5% of a slipping agent;
   0.1 to 20% of another silicate derivative as an additional slipping agent; and
   water.

3. The plaster board according to claim 2, wherein the mineral filler is calcium carbonate, the binder is either polyvinyl acetate or acrylic acid ester in aqueous solution, the handling agent is a cellulosic ether, the slipping agent is clay, and the additional slipping agent is either talc or mica.

4. The plaster board according to claim 1, wherein the surface absorption of said skim coat is not less than 60 minutes such as measured by the water drop test at 23° C.

5. The plaster board according to claim 1, wherein the reflectance factor of said skim coat is in the range of 70% to 80%, for a wavelength of 475 nm.

6. The plaster board according to claim 5, wherein the reflectance factor is in the range of 72% to 76%.

7. The plaster board according to claim 1, wherein the discoloration or coloration of said skim coat has a color deviation (delta E*) at most equal to 3 after exposure for 72 hours to a source of UV radiation arranged at 15 cm from the surface and having a wavelength at least equal to 290 nm.

8. The plaster board of claim 1, wherein said skim coat comprises a mineral filler and a binder.

9. The plaster board of claim 1, wherein said skim coat comprises a mineral filler of having a grain size of between 5 and 35 µm.

10. The plaster board of claim 1, wherein said skim coat comprises, on a wet basis, a mineral filler in an amount of between 40% and 70% of the total weight.

11. The plaster board of claim 1, wherein said skim coat comprises, on a wet basis, an organic binder dispersible in an aqueous phase, which organic binder represents between 1% and 20% of the total weight.

12. The plaster board of claim 11, wherein said organic binder represents between 2% and 12% of the total weight.

13. The plasterboard according to claim 1, wherein said skim coat has a thickness between about 0.2 mm and about 1 mm.

14. A flat prefabricated plaster board, comprising a plaster body and at least one sheet of liner, the liner including an inner surface attached to the plaster body and an outer surface having an outer face, and a jointing material type skim coat deposited on said outer surface of said lining paper, said skim coat having a thickness between about 0.2 mm and about 2 mm, and wherein the surface absorption of said skim coat is not less than 60 minutes such as measured by the water drop test at 23° C. and wherein the reflectance factor of said skim coat is between 70% and 80% for a wavelength of 475 nm.

15. The plaster board of claim 14, wherein the reflectance factor of said skim coat is between 72% and 76% for a wavelength of 475 nm.

16. The plaster board of claim 14, wherein said skim coat comprises a mineral filler and a binder.

17. The plaster board of claim 14, wherein said skim coat comprises a mineral filler of having a grain size of between 5 and 35 µm.

18. The plaster board of claim 14, wherein said skim coat comprises, on a wet basis, a mineral filler in an amount of between 40% and 70% of the total weight.

19. The plaster board of claim 14, wherein said skim coat comprises, on a wet basis, an organic binder dispersible in an aqueous phase, which organic binder represents between 1% and 20% of the total weight.

20. The plaster board of claim 14, wherein said organic binder represents between 2% and 12% of the total weight.

21. A flat prefabricated plaster board, comprising a plaster body and at least one sheet of liner, the liner including an inner surface attached to the plaster body and an outer surface having an outer face, and a jointing material type skim coat deposited on said outer surface of said lining paper, said skim coat comprising a mineral filler and a binder and having a thickness between about 0.2 mm and about 2 mm, and wherein the surface absorption of said skim coat is not less than 60 minutes such as measured by the water drop test at 23° C. and wherein the reflectance factor of said skim coat is between 70% and 80% for a wavelength of 475 nm.

22. The plaster board of claim 21, wherein the reflectance factor of said skim coat is between 72% and 76% for a wavelength of 475 nm.

23. The plaster board of claim 21, wherein said skim coat comprises a mineral filler of having a grain size of between 5 and 35 µm.

24. The plaster board of claim 21, wherein said skim coat comprises, on a wet basis, a mineral filler in an amount of between 40% and 70% of the total weight.

25. The plaster board of claim 21, wherein said skim coat comprises, on a wet basis, an organic binder dispersible in an aqueous phase, which organic binder represents between 1% and 20% of the total weight.

26. A flat prefabricated plaster board, comprising a plaster body and at least one sheet of lining paper, wherein the lining paper comprises an upper layer or web comprising cellulose fibers or cellulose fibers and a mineral filler, and a coating layer comprising a jointing material type skim coat deposited on said lining paper by a coating roll, said skim coat having a thickness between about 0.01 mm and about 2 mm, and wherein said skim coat comprises a mineral filler having a grain size of between 5 and 35 µm.

27. The plasterboard according to claim 26, wherein said skim coat has a thickness between about 0.2 mm and about 1 mm.

28. The plaster board according to claim 6, wherein said skim coat comprises, by weight:
- 40 to 70% of a mineral filler;
- 1 to 10% of hydrophobic surface perlite;
- 0.1 to 10% of a binder;
- 0.1 to 10% of a handling agent;
- 0.1 to 5% of a slipping agent;
- 0.1 to 20% of another silicate derivative as an additional slipping agent; and
- water.

29. The plaster board according to claim 26, wherein the surface absorption of said skim coat is not less than 60 minutes such as measured by the water drop test at 23° C.

30. The plaster board according to claim 26, wherein the reflectance factor of said skim coat is in the range of 70% to 80%, for a wavelength of 475 nm.

31. The plaster board according to claim 30, wherein the reflectance factor is in the range of 72% to 76%.

32. The plaster board according to claim 26, wherein the discoloration or coloration of said skim coat has a color deviation (delta E*) at most equal to 3 after exposure for 72 hours to a source of UV radiation arranged at 15 cm from the surface and having a wavelength at least equal to 290 nm.

33. The plaster board of claim 26, wherein said skim coat comprises, on a wet basis, a mineral filler in an amount of between 40% and 70% of the total weight.

34. The plaster board of claim 26, wherein said skim coat comprises, on a wet basis, an organic binder dispersible in an aqueous phase, which organic binder represents between 1% and 20% of the total weight.

35. The plaster board of claim 34, wherein said organic binder represents between 2% and 12% of the total weight.

36. A flat prefabricated plaster board, comprising a plaster body and at least one sheet of liner, the liner including an inner surface attached to the plaster body and an outer surface having an outer face, and a jointing material type skim coat deposited on said outer surface of said lining paper, said skim coat having a thickness between about 0.01 mm and about 2 mm, and wherein the surface absorption of said skim coat is not less than 60 minutes such as measured by the water drop test at 23° C. and wherein the reflectance factor of said skim coat is between 70% and 80% for a wavelength of 475 nm, and wherein said skim coat comprises a mineral filler having a grain size of between 5 and 35 μm.

37. The plaster board of claim 36, wherein the reflectance factor of said skim coat is between 72% and 76% for a wavelength of 475 nm.

38. The plaster board of claim 36, wherein said skim coat comprises, on a wet basis, a mineral filler in an amount of between 40% and 70% of the total weight.

39. The plaster board of claim 36, wherein said skim coat comprises, on a wet basis, an organic binder dispersible in an aqueous phase, which organic binder represents between 1% and 20% of the total weight.

40. The plaster board of claim 36, wherein said organic binder represents between 2% and 12% of the total weight.

41. A flat prefabricated plaster board, comprising a plaster body and at least one sheet of liner, the liner including an inner surface attached to the plaster body and an outer surface having an outer face, and a jointing material type skim coat deposited on said outer surface of said lining paper, said skim coat comprising a mineral filler and a binder and having a thickness between about 0.01 mm and about 2 mm, and wherein the surface absorption of said skim coat is not less than 60 minutes such as measured by the water drop test at 23° C. and wherein the reflectance factor of said skim coat is between 70% and 80% for a wavelength of 475 nm, and wherein said mineral filler has a grain size of between 5 and 35 μm.

42. The plaster board of claim 41, wherein the reflectance factor of said skim coat is between 72% and 76% for a wavelength of 475 nm.

43. The plaster board of claim 41, wherein said skim coat comprises, on a wet basis, a mineral filler in an amount of between 40% and 70% of the total weight.

44. The plaster board of claim 41, wherein said skim coat comprises, on a wet basis, an organic binder dispersible in an aqueous phase, which organic binder represents between 1% and 20% of the total weight.

45. A flat prefabricated plaster board, comprising a plaster body and at least one sheet of lining paper, wherein the lining paper comprises an upper layer or web comprising cellulose fibers or cellulose fibers and a mineral filler, and a coating layer comprising a jointing material type skim coat deposited on said lining paper by a coating roll, said skim coat having a thickness between about 0.2 mm and about 2 mm, and wherein said skim coat comprises a mineral filler having a grain size of between 5 and 35 μm.

* * * * *

UNITED STATES PATENT AND TRADEMARK OFFICE
CERTIFICATE OF CORRECTION

| | | |
|---|---|---|
| PATENT NO. | : 7,208,225 B2 | Page 1 of 1 |
| APPLICATION NO. | : 10/308084 | |
| DATED | : April 24, 2007 | |
| INVENTOR(S) | : Francois Zuber et al. | |

It is certified that error appears in the above-identified patent and that said Letters Patent is hereby corrected as shown below:

On the Title Page (54) and col. 1 line 1, please correct title as follows:

"PREFABRICATED PLASTER BOARD" to --A FLAT PREFABRICATED PLASTER BOARD--

Signed and Sealed this

Thirteenth Day of November, 2007

JON W. DUDAS
*Director of the United States Patent and Trademark Office*